(12) United States Patent  (10) Patent No.: US 8,586,254 B2
Vajo  (45) Date of Patent: Nov. 19, 2013

(54) HYDROGEN STORAGE IN LITHIUM-CARBON SYSTEMS

(75) Inventor: John J. Vajo, West Hills, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/172,091

(22) Filed: Jun. 29, 2011

(65) Prior Publication Data

US 2013/0004867 A1 Jan. 3, 2013

(51) Int. Cl.
*H01M 8/06* (2006.01)

(52) U.S. Cl.
USPC ............................ 429/421; 422/242; 423/650

(58) Field of Classification Search
USPC ............................ 429/421; 422/242; 423/650
See application file for complete search history.

(56) References Cited

U.S. PATENT DOCUMENTS

2010/0055517 A1* 3/2010 Uzhinsky et al. ............... 429/17

* cited by examiner

*Primary Examiner* — Nicholas P D'Aniello
(74) *Attorney, Agent, or Firm* — BrooksGroup

(57) ABSTRACT

An exemplary embodiment and associated method of use discloses a reversible hydrogen storage system that liberates hydrogen and a perlithiohydrocarbon compound by destabilization of a hydrocarbon source or sources with lithium hydride (LiH). The liberated hydrogen may be subsequently utilized in a coupled end-use application.

16 Claims, 1 Drawing Sheet

HYDROGEN STORAGE IN LITHIUM-CARBON SYSTEMS

TECHNICAL FIELD

The technical field generally relates generally to storage materials and more specifically to hydrogen storage in lithium-carbon systems.

BACKGROUND

Lithium and carbon form a variety of lithium-carbon compounds.

SUMMARY OF EXEMPLARY EMBODIMENTS OF THE INVENTION

An exemplary embodiment and associated method of use discloses a reversible hydrogen storage system that liberates hydrogen and a perlithiohydrocarbon compound by destabilization of selected hydrocarbons with lithium hydride (LiH). The liberated hydrogen may then be coupled to an end-use application that utilizes hydrogen in its operation.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

One exemplary embodiment includes a system for storing hydrogen, in the form of a selective hydrocarbon source. This system may be subsequently acted upon by lithium hydride (LiH) to evolve hydrogen that may be subsequently used in a wide variety of end-use applications.

Figure 1:
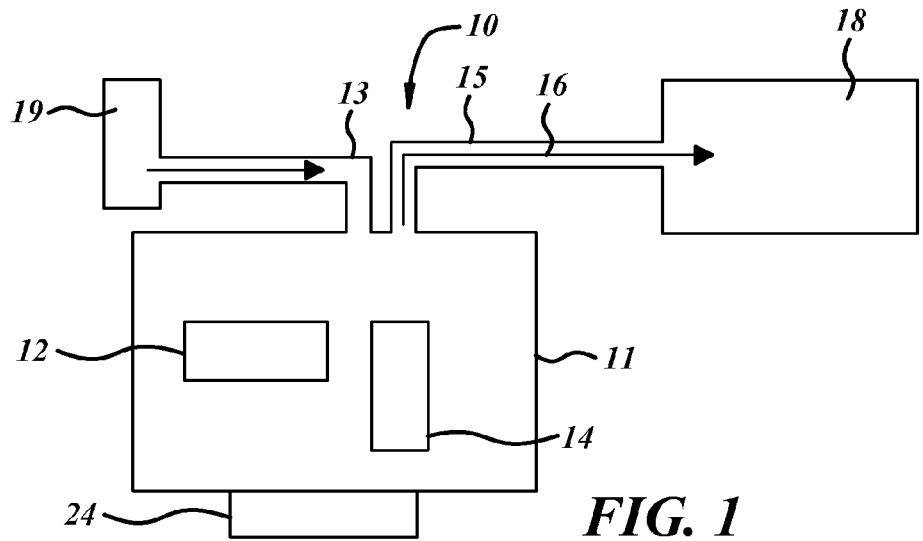
FIG. 1 is a schematic diagram of a hydrogen gas storage system according to one exemplary embodiment.

One exemplary embodiment of a hydrogen gas storage system 10 coupled to an end-use application 18 is illustrated in FIG. 1. The storage system 10 may include a storage container 11 that includes a replenishment inlet 13 and a hydrogen gas outlet 15 and a heater 24. Contained within the storage container 11 may be a hydrocarbon source 12, or hydrocarbon sources 12, and lithium hydride 14.

The hydrocarbon source or sources 12 may, in one exemplary embodiment, be in liquid form. In this case, the container 11 may also include a stirring device (not shown) to keep the lithium hydride well dispersed within the liquid hydrocarbon source or sources 12.

In another exemplary embodiment, the hydrocarbon source or sources 12 may be in solid form. In this example, the hydrogen exchange may occur in the solid mixture of the hydrocarbon source 12 and lithium hydride 14 for compounds with sufficiently high melting points.

In some examples, wherein the compounds have appreciable vapor pressures, a separator or condenser (not shown) may also be included in the container 10.

When the storage system 10 is heated to an elevated temperature by a heater 24, and possibly pressurized to an elevated pressure, the hydrocarbon source or sources 12 may react with the lithium hydride 14 to form a perlithiohydrocarbon compound and hydrogen gas ("the hydrogen evolution reaction"). The hydrogen gas (shown by arrow 16) may then exit the container 11 through the hydrogen gas outlet 15 and may be introduced to the end-use application 18 for subsequent use. Heterogeneous or homogeneous catalysts, solvents, or porous supports (not shown) may be introduced within the container 11 to aid in attaining the needed rates of hydrogen exchange between the hydrocarbon source or sources 12 and the lithium hydride 14 to drive the evolution of hydrogen gas 16.

The hydrogen evolution reaction may proceed until such time as either the pressure or temperature, or both the pressure and temperature, may be sufficiently decreased within the container 11.

Alternatively, the hydrogen evolution reaction may proceed until such time as either the hydrocarbon source or sources 12 or the lithium hydride 14 within the container 11 may be exhausted. In these circumstances, the hydrocarbon source or sources 12 or the lithium hydride 14 may be replenished.

In one exemplary replenishment method, wherein the hydrogen evolution reaction is an endothermic reaction, the hydrocarbon source or sources 12, and the lithium hydride 14, may be replenished by changing the pressure and temperature conditions and supplying hydrogen to the perlithiohydrocarbon compound. For example, if hydrogen was generated at a certain pressure, then the reaction may be reversed by applying hydrogen at a sufficiently higher pressure to reverse the reaction.

In another exemplary replenishment, wherein the hydrogen evolution reaction is an exothermic reaction, the hydrocarbon source 12 or sources and/or the lithium hydride 14 may be replenished from an exterior storage container 19 through a replenishment inlet 13.

End-use applications 18 that may require hydrogen derived from the hydrogen evolution reaction may include, but are not limited to, military, wherein hydrogen may be desirable for stationary and mobile power sources, remote power sources, and low signature power sources. Another end-use application 18 may be in aerospace applications, wherein hydrogen may be used to power an auxiliary fuel cell. Another application may be automotive, wherein the exemplary embodiments could provide hydrogen for use in fuel cells and combustion engines. Yet another end-use application 18 may be commercial, wherein hydrogen may be utilized to distribute power for stationary cells. Still another end-use application 18 may be consumer oriented, such as wherein the exemplary embodiments could provide hydrogen for use in fuel cell powered portable electronic devices.

Many of these potential end-use applications 18 have specific requirements regarding the amount of hydrogen needed, as well as practical limitations regarding the storage of the hydrocarbon source or sources 12 and the lithium hydride 14. In addition, there may be practical limitations associated with the reaction kinetics for evolving hydrogen during the hydrogen evolution reaction that may limit their desirability for use. Thus, a strategy for determining which hydrocarbon source or sources 12 may be desirable for evolving hydrogen for use in a particular end-use application 18 may also be developed.

Figure 2:
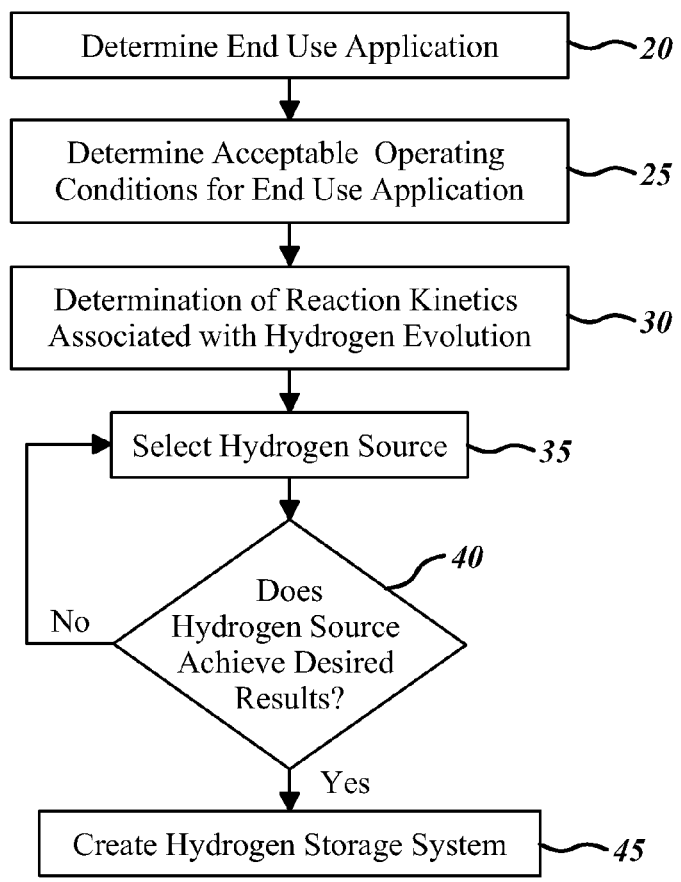
FIG. 2 is a logic flow diagram that provides a strategy for determining one or more hydrocarbon gases that may be reacted lithium hydride (LiH) to evolve hydrogen according to an exemplary method.

Referring first to FIG. 2, a logic flow diagram may be provided that provides a strategy for determining the one or more hydrocarbon sources 12 that may be utilized for evolving hydrogen 16 for subsequent use in a particular end-use application 18.

Thus, beginning in box 20, a determination may be made as to the particular end-use application 18 requiring hydrogen supplied from the hydrogen evolution reaction.

Next, in box 25, a determination may be made as to the acceptable operating conditions associated with a system 10 that is coupled to the selected end-use application 18. At a minimum, a determination may be made of acceptable performance characteristics based upon chemical reaction dynamics associated with the hydrogen evolution reaction. For example, a hydrogen evolution reaction that is too exothermic or too endothermic may not be able to be utilized with a particular end-use application.

In addition, a review of the desired requirements for storing the hydrocarbon source or sources 12 and the lithium hydride 14 may be determined. For example, a hydrocarbon source 12 that is chemically unstable, or reactive with the storage container 11, or in a particular form (solid, liquid or gas) at a particular temperature or pressure, may not be selected. Also, the requirements for replenishing the hydrocarbon source or sources 12 and/or the lithium hydride 14 from a supplemental container 19 may be considered.

Next, in box 30, a determination may be made as to the reaction kinetics associated with hydrogen gas evolution as a result of the reaction of the hydrocarbon source 12 and the lithium hydride 14. This includes, at a minimum, of a determination of the minimum hydrogen storage capacity of the one or more hydrocarbon sources 12, the associated potential amount of hydrogen that is released from a particular hydrocarbon source or sources (preferably at least 9%, and more preferably at least 12% hydrogen evolution) the enthalpy of the reaction evolving hydrogen from the reaction between the particular hydrocarbon source or sources 12 and lithium hydride 14, the free energy at a particular temperature and pressure for the hydrogen evolution reaction between the hydrocarbon source or sources 12 and lithium hydride 14, and other related factors. A list of each possible hydrocarbon source or sources 12 meeting these requirements may then be determined.

Next, in box 35, a determination may be made as to one or more hydrogen sources 12 that meet the requirements for evolving hydrogen 16 for a particular end-use application 18 as determined from the logic of boxes 25 and 30, including from the list in box 30.

In box 40, the hydrocarbon source or sources 12 identified in box 35 from the list may be introduced to a hydrogen gas storage system 10 that has been coupled to an end-use application 18 as identified in box 20. The hydrocarbon source or sources 12 may then evaluated by reacting them with lithium hydride 14 to determine whether the hydrogen gas evolution reaction achieves hydrogen evolution for supplying to the end-use application 18. In addition, the reaction kinetics regarding the hydrogen gas evolution reaction may also be evaluated to determine whether they meet the requirements for the system 10. Finally, confirmation of the storage and delivery of the hydrocarbon source or sources 12 may be tested to ensure it meets the desired requirements.

If the selected hydrocarbon source or sources 12 meet each of the desired performance characteristics within the system 10, the logic proceeds to box 45, otherwise the logic reverts back to box 35 for redetermination of one or more other acceptable hydrogen sources 12 to evaluate from the list.

In box 45, a system 10 may be created associated with the end-use application 18 that includes hydrogen storage reactors or containers 11 having the hydrogen source or sources 12 identified and tested in boxes 35 and 40.

Exemplary hydrocarbon sources 12 that may be utilized react with LiH to liberate hydrogen and form the so-called perlithiohydrocarbon compounds. A perlithiohydrocarbon compound, for the purposes of this disclosure, is defined wherein a vast majority of hydrogen atoms on the hydrocarbon source or sources 12 is replaced with a corresponding lithium atom when the hydrocarbon is reacted with lithium hydride.

One exemplary subset of a hydrocarbon source 12 that may be utilized are derived from saturated hydrocarbons, (i.e. compounds consisting of hydrogen and carbon atoms wherein the atoms are linked together exclusively through single bonds, also known as alkanes). This may include methane ($Li_4C$), ethane ($Li_6C_2$), cyclic compounds such as $C_6H_{12}$, and the like.

Another exemplary subset of a hydrocarbon source 12 that may be utilized are derived from unsaturated hydrocarbons such as alkenes (i.e. hydrocarbon compounds having at least one double bond between two carbon atoms) or alkynes (i.e. hydrocarbon compounds having at least one triple bond between carbon atoms).

Exemplary hydrocarbon sources 12 derived from alkenes may include $Li_4C_2$, which is derived from ethylene, and $Li_6C_3$, which is derived from propylene, and $Li_6C_6$, which is derived from benzene. Exemplary perlithiohydrocarbon compounds derived from an alkynes that may be utilized is $Li_4C_3$, which is derived from propyne, and $Li_2C_2$, which is derived from acetylene.

Still another exemplary subset of a hydrocarbon source 12 that may be used includes a combination of two or more perlithiohydrocarbon compounds from the description above.

Another exemplary subset of a hydrocarbon source or sources 12 that may be used in fuel cell applications are hydrocarbon compounds that provide reversible storage of hydrogen of at least 9 weight percent at moderate temperatures and pressures.

Yet another exemplary subset of a hydrocarbon source or sources 12 that may be used in fuel cell applications are hydrocarbon compounds that provide reversible storage of hydrogen of at least 12 weight percent at moderate temperatures and pressures.

One exemplary hydrocarbon source 12 is acetylene, which reacts with LiH to form $Li_2C_2$ and $3H_2$. The thermodynamics of this reaction may be well suited for reversible hydrogen storage with a calculated equilibrium hydrogen pressure of 1 bar at 90 degrees Celsius and an enthalpy of the reacting system at 20 degrees Celsius of 23 kJ/mole-$H_2$ (i.e. slightly endothermic). An estimated hydrogen evolution of about 13.7% may be realized by reacting acetylene with LiH.

Possible specific embodiments of hydrocarbon sources 12 that may be reacted with LiH to evolve hydrogen and a perlithiohydrocarbon compound (ethylene, ethane, propyne, propylene, and benzyl-containing hydrocarbons and benzene) are as follows:

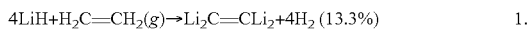

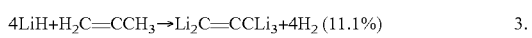

$$6LiH + H_2C=CHCH_3 \rightarrow Li_2C=CLiCLi_3 + 4H_2 \text{ (13.3\%)} \qquad 4.$$

$$8LiH + (C_6H_5C\equiv CCH_3 \text{ or } HC\equiv CCH_2C_6H_5) \rightarrow C_9Li_8 + 8H_2 \text{ (8.8\%)} \qquad 5.$$

$$6Li + C_6H_6 \rightarrow C_6Li_6 + 6H_2 \text{ (9.5\%)} \qquad 6.$$

The reactions of examples 1-6 above, and example 7 that follows, are shown as idealized complete reactions (i.e. where each hydrogen atom on the respective hydrogen source is replaced with a lithium atom), but one of ordinary skill may recognize that the reactions may not be idealized (i.e. where most, but not all, hydrogen atoms are replaced on the hydrogen source by a corresponding lithium atom).

For an extended unbranched alkane, such as polyethylene in one exemplary embodiment, a specific hydrogen evolution reaction mechanism is as follows:

$$2nLiH + (CH_2)_n \rightarrow (CLi_2)n + 2nH_2 \text{ (13.6\%)} \qquad 7.$$

Hydrogen exchange reactions as described above in examples 1-7 (where the thermodynamics of the reactions are not well known because the perlithiohydrocarbon species have not been measured) may be implemented several ways, depending upon the properties of the hydrocarbon sources 12 and perlithiohydrocarbon compounds at particular temperatures and pressures. For example, hydrogen exchange can occur in solid mixtures for compounds with high melting points. For liquid hydrocarbon sources 12, a stirred reactor (not shown) may be required to keep the solid LiH dispersed. For hydrocarbon sources 12 with appreciable vapor pressures, a separator or condenser (not shown) may be used. In addition, attaining the desired rates of hydrogen evolution may require the use of heterogeneous or homogeneous catalysts, solvents or porous supports.

The above description of embodiments of the invention is merely exemplary in nature and, thus, variations thereof are not to be regarded as a departure from the spirit and scope of the invention.

What is claimed is:

1. A method comprising
providing an end-use application that utilizes hydrogen;
coupling a hydrogen gas storage system to said end-use application, wherein the hydrogen gas storage system comprises a quantity of at least one hydrocarbon source and a quantity of lithium hydride;
maintaining said hydrogen gas storage system at a temperature and a pressure wherein said quantity of said at least one hydrocarbon source does not substantially react with said quantity of lithium hydride;
altering said temperature or said pressure or both said temperature and said pressure to cause said quantity of said at least one hydrocarbon source to react with said quantity of lithium hydride to generate a quantity of hydrogen and a perlithiohydrocarbon compound; and
removing said generated quantity of hydrogen from said hydrogen gas storage system to said end-use application.

2. The method of claim 1 further comprising:
replenishing said quantity of said at least one hydrocarbon source within said hydrogen gas storage system.

3. The method of claim 2, wherein replenishing said quantity of said at least one hydrocarbon source within said hydrogen gas storage system comprises:
introducing a second quantity of hydrogen to said hydrogen gas storage system; and
adjusting said temperature or said pressure or both said temperature and said pressure to cause said second quantity of hydrogen to react with said perlithiohydrocarbon compound to generate lithium hydride and a second quantity of said at least one hydrocarbon source.

4. The method of claim 1, wherein altering said temperature or said pressure or both said temperature and said pressure to cause said quantity of said at least one hydrocarbon source to react with said quantity of lithium hydride to generate a quantity of hydrogen and a perlithiohydrocarbon compound when said end-use application requires hydrogen comprises:
heating said quantity of said at least one hydrocarbon source and said quantity of lithium hydride to an elevated temperature sufficient to cause said quantity of said at least one hydrocarbon source to react with said lithium hydride to generate a quantity of hydrogen and a perlithiohydrocarbon compound.

5. The method of claim 1, wherein altering said temperature or said pressure or both said temperature and said pressure to cause said quantity of said at least one hydrocarbon source to react with said quantity of lithium hydride to generate a quantity of hydrogen and a perlithiohydrocarbon compound when said end-use application requires hydrogen comprises:
increasing a pressure within said hydrogen gas storage system to an elevated pressure sufficient to cause said quantity of said at least one hydrocarbon source to react with said lithium hydride to generate a quantity of hydrogen and a perlithiohydrocarbon compound.

6. The method of claim 1, wherein altering said temperature or said pressure or both said temperature and said pressure to cause said quantity of said at least one hydrocarbon source to react with said quantity of lithium hydride to generate a quantity of hydrogen and a perlithiohydrocarbon compound when said end-use application requires hydrogen comprises:
heating said quantity of said at least one hydrocarbon source and said quantity of lithium hydride to an elevated temperature;
increasing a pressure within said hydrogen gas storage system to an elevated pressure;
wherein the combination of said elevated pressure and said elevated temperature are sufficient to cause said quantity of said at least one hydrocarbon source to react with said lithium hydride to generate a quantity of hydrogen and a perlithiohydrocarbon compound.

7. The method of claim 1, wherein the reaction of said quantity of said at least one hydrocarbon source with lithium hydride generates a release of hydrogen of at least 9 weight percent of said quantity of said at least one hydrocarbon source.

8. The method of claim 1, wherein the reaction of said quantity of said at least one hydrocarbon Source with lithium hydride generates a release of hydrogen of at least 12 weight percent of said quantity of said hydrocarbon source.

9. The method of claim 8, wherein said at least one hydrocarbon source comprises acetylene.

10. The method of claim 1, wherein said end-use application is selected from the group consisting of a stationary power source, a mobile power source, a remote power source, a low signature power source, an auxiliary fuel cell, an automotive fuel cell, an automotive fuel cell coupled to a combustion engine, a stationary cell, and a fuel cell powered portable electronic device.

11. The method of claim 1 further comprising:
(a) determining a first list of hydrocarbon sources that generates a release of at least 9 weight percent hydrogen from said at least one hydrocarbon source when reacted with a quantity of lithium hydride;

(b) determining a second list of said at least one hydrocarbon sources from said first list of said at least one hydrocarbon sources are relatively stable and substantially unreactive with lithium hydride at said predetermined temperature and said predetermined pressure;

(c) selecting at least one of said at least one hydrocarbon sources from said second list that is not highly exothermic or highly endothermic at said predetermined pressure; and (d) introducing a quantity of said at least one of said at least one hydrocarbon sources selected in step (c) to said hydrogen gas storage system.

12. The method of claim 1 further comprising:
(a) determining a first list of hydrocarbon sources that generates a release of at least 12 weight percent hydrogen from said at least one hydrocarbon Source when reacted with a quantity of lithium hydride;
(b) determining a second list of said at least one hydrocarbon sources from said first list of said at least one hydrocarbon sources are relatively stable and substantially unreactive with lithium hydride at said predetermined temperature and said predetermined pressure;
(c) selecting at least one of said at least one hydrocarbon sources from said second list that is not highly exothermic or highly endothermic at said predetermined pressure; and
(d) introducing a quantity of said at least one of said at least one hydrocarbon sources selected in step (c) to said hydrogen gas storage system.

13. A method comprising
providing a hydrogen gas storage system comprises a quantity of at least one hydrocarbon source and a quantity of lithium hydride;
maintaining said hydrogen gas storage system at a temperature and a pressure wherein said quantity of said at least one hydrocarbon source does not substantially react with said quantity of lithium hydride;
altering said temperature or said pressure or both said temperature and said pressure to cause said quantity of said at least one hydrocarbon source to react with said quantity of lithium hydride to generate a quantity of hydrogen and a perlithiohydrocarbon compound; and
removing said generated quantity of hydrogen from said hydrogen gas storage system.

14. A method comprising
providing a hydrogen gas storage system comprises a quantity of at least one hydrocarbon source and a quantity of lithium hydride;
maintaining said hydrogen gas storage system at a temperature and a pressure wherein said quantity of said at least one hydrocarbon source does not substantially react with said quantity of lithium hydride, wherein said at least one hydrocarbon source comprises acetylene;
altering said temperature or said pressure or both said temperature and said pressure to cause said quantity of said at least one hydrocarbon source to react with said quantity of lithium hydride to generate a quantity of hydrogen and a perlithiohydrocarbon compound; and
removing said generated quantity of hydrogen from said hydrogen gas storage system.

15. A method comprising
providing a hydrogen gas storage system comprises a quantity of at least one hydrocarbon source and a quantity of lithium hydride;
maintaining said hydrogen gas storage system at a temperature and a pressure wherein said quantity of said at least one hydrocarbon source does not substantially react with said quantity of lithium hydride, wherein said at least one hydrocarbon source comprises at least one of acetylene, ethylene, propyne, propylene, or polyethylene;
altering said temperature or said pressure or both said temperature and said pressure to cause said quantity of said at least one hydrocarbon source to react with said quantity of lithium hydride to generate a quantity of hydrogen and a perlithiohydrocarbon compound; and
removing said generated quantity of hydrogen from said hydrogen gas storage system.

16. A method comprising
providing a hydrogen gas storage system comprises a quantity of at least one hydrocarbon source and a quantity of lithium hydride;
maintaining said hydrogen gas storage system at a temperature and a pressure wherein said quantity of said at least one hydrocarbon source does not substantially react with said quantity of lithium hydride;
altering said temperature or said pressure or both said temperature and said pressure to cause said quantity of said at least one hydrocarbon source to react with said quantity of lithium hydride to generate a quantity of hydrogen and a perlithiohydrocarbon compound according to at least one of the following reactions:

$$4LiH + H_2C=CH_2(g) \rightarrow Li_2C=CLi_2 + 4H_2 \qquad 1.$$

$$6LiH + H_3CCH_3(g) \rightarrow Li_3CCLi_3 + 6H_2 \qquad 2.$$

$$4LiH + H_2C=CCH_3 \rightarrow Li_2C=CCLi_3 + 4H_2 \qquad 3.$$

$$6LiH + H_2C=CHCH_3 \rightarrow Li_2C=CLiCLi_3 + 4H_2 \qquad 4.$$

$$8LiH + (C_6H_5C=CCH_3 \text{ or } HC=CCH_2C_6H_5) \rightarrow C_9Li_8 + 8H_2 \qquad 5.$$

or $$6Li + C_6H_6 \rightarrow C_6Li_6 + 6H_2 \qquad 6.$$

removing said generated quantity of hydrogen from said hydrogen gas storage system.

* * * * *